United States Patent [19]
Widney

[11] Patent Number: 4,947,800
[45] Date of Patent: Aug. 14, 1990

[54] ANIMAL HOLDING CHUTE WITH MEANS FOR MOVING ANIMAL'S HEAD

[76] Inventor: Wilford L. Widney, Rt. 1, Box 27, Watonga, Okla. 73772

[21] Appl. No.: 407,889

[22] Filed: Sep. 15, 1989

[51] Int. Cl.$^5$ .............................................. A62D 3/00
[52] U.S. Cl. ........................................ 119/98; 119/99
[58] Field of Search .......................... 119/98, 99, 147.1

[56] References Cited

U.S. PATENT DOCUMENTS

| | | | |
|---|---|---|---|
| 3,087,195 | 4/1963 | Marshall et al. | 119/99 |
| 3,092,871 | 6/1963 | Marshall et al. | 119/99 |
| 4,513,690 | 4/1985 | Waldron | 119/99 |
| 4,702,200 | 10/1987 | Simington | 119/99 |

FOREIGN PATENT DOCUMENTS

| | | | |
|---|---|---|---|
| 402108 | 1/1969 | Australia | 119/98 |
| 814686 | 6/1959 | United Kingdom | 119/99 |

Primary Examiner—Gene Mancene
Assistant Examiner—R. Thomas Price
Attorney, Agent, or Firm—Dunlap, Codding Peterson & Lee

[57] ABSTRACT

An animal holding chute with a head bar and means for moving the head bar from a storage positon to an operating position wherein the head bar engages the animal's head and moves the animal's head generally toward one side of the animal holding chute, the head bar operating to substantially secure or stabilize the animal's head and neck in this bent position.

16 Claims, 3 Drawing Sheets

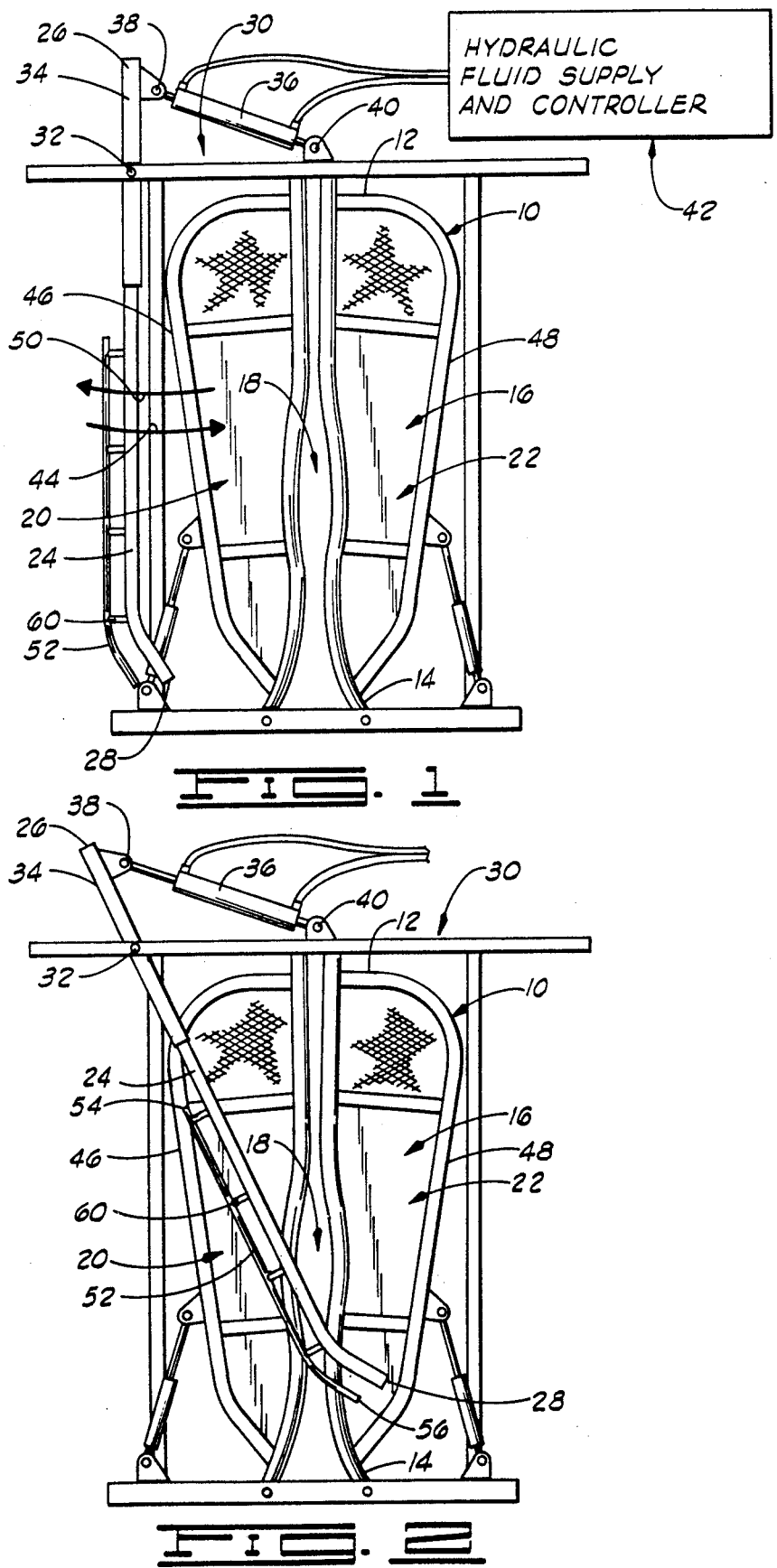

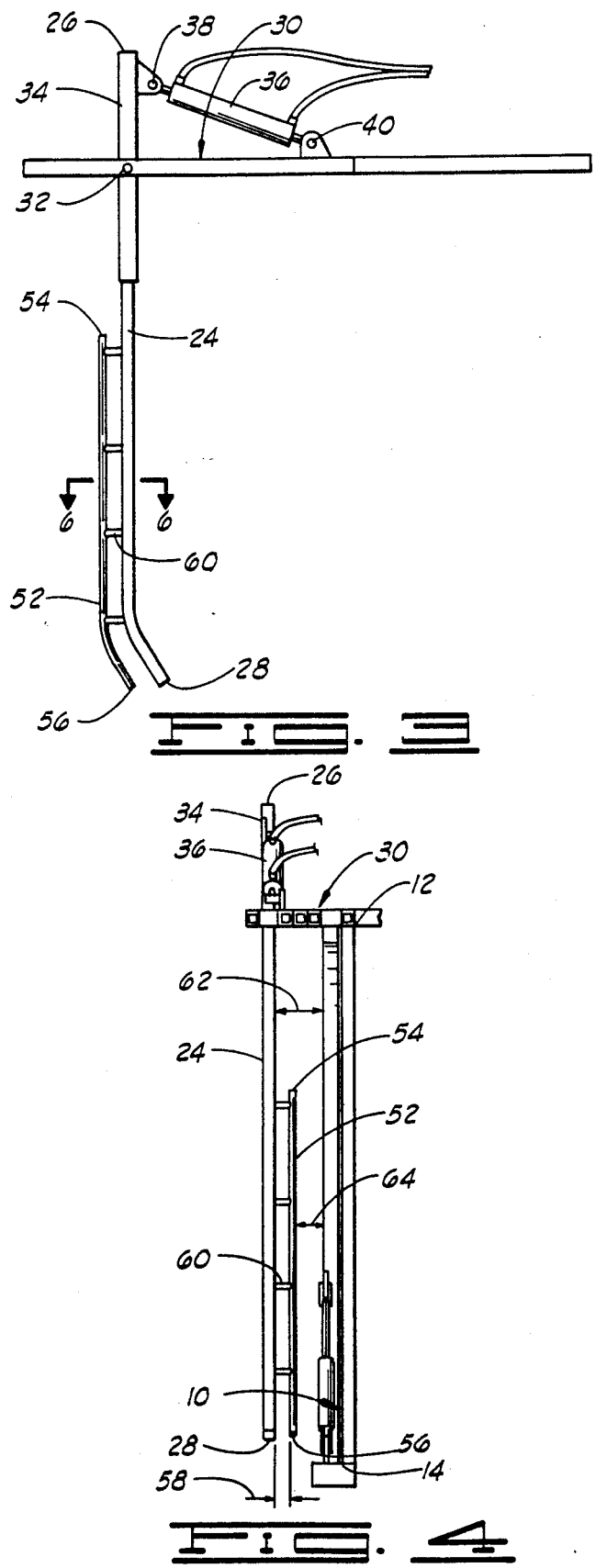

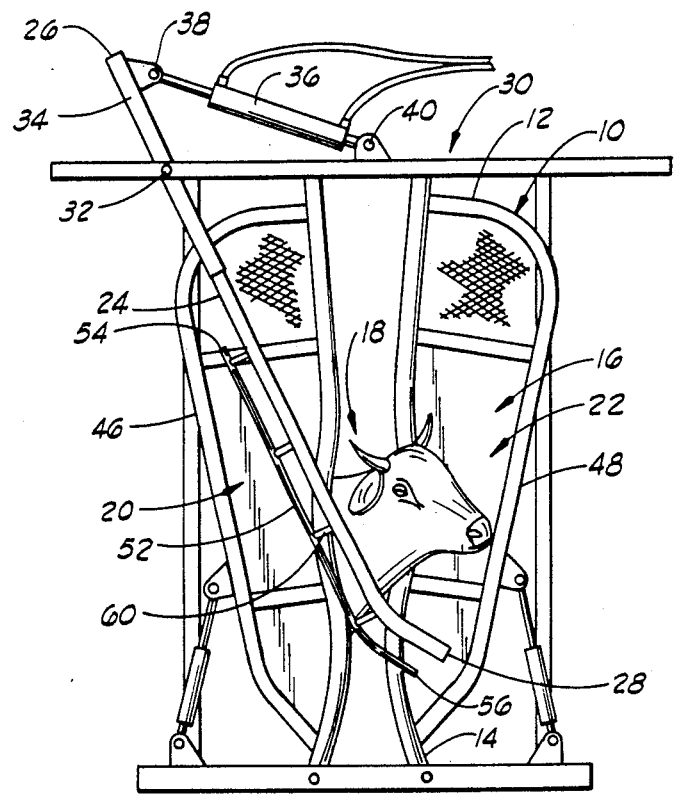
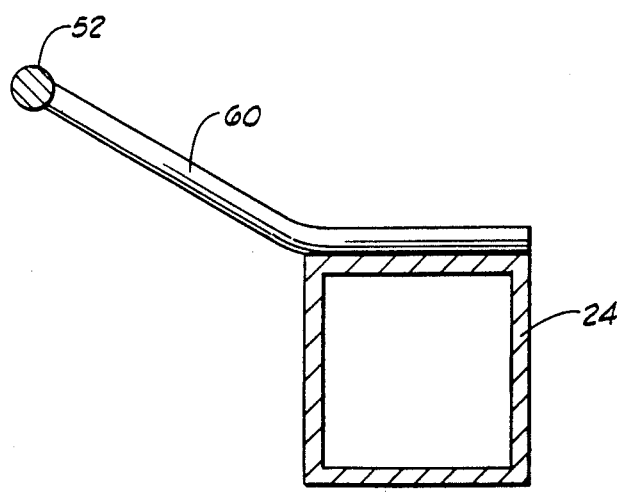
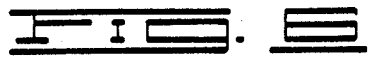

ANIMAL HOLDING CHUTE WITH MEANS FOR MOVING ANIMAL'S HEAD

FIELD OF THE INVENTION

An animal holding chute with a head bar for moving the animal's head to a bent position and for substantially securing or stabilizing the animal's head and neck area in this bent position.

BRIEF DESCRIPTION OF THE DRAWINGS

FIG. 1 is a front elevational view of an animal chute with the head bar of the present invention mounted thereon showing the head bar in a storage position.

FIG. 2 is a front elevational view of the animal chute of FIG. 1 showing the head bar in an operating position.

FIG. 3 is a front elevational view of the head bar of the present invention showing a portion of the frame assembly for mounting the head bar to an animal chute and the means for moving the head bar to the storage position and to the operating position.

FIG. 4 is a side elevational view of the head bar of the present invention and showing a portion of the forward end of the animal chute.

FIG. 5 is a view similar to FIG. 2, but showing the head bar engaging the animal's head for moving the animal's head generally toward one side of the animal holding chute.

FIG. 6 is a sectional view of the head bar of the present invention, taken substantially along the lines 6—6 of FIG. 3.

DESCRIPTION OF THE PREFERRED EMBODIMENTS

Shown in FIGS. 1, 2, 4 and 5 is a typical animal chute 10. The animal chute 10 has an upper end 12, a lower end 14 and a forward end 16. A head opening 18 is formed through the forward end 16 of the animal chute 10 and the head opening 18 is sized and shaped to accommodate the animal's head whereby the animal's neck and head are disposed generally through the head opening 18 with the animal's head extending a distance from the head opening 18 and from the forward end 16 of the animal chute 10 in an operating position of the animal holding chute 10, as shown in FIG. 1, 2 and 5.

The animal chute shown in FIGS. 1, 2 and 3 includes a first side assembly 20 and a second side assembly 22. The first and the second side assemblies 20 and 22 are movably supported so that the first side assembly 20 and the second side assembly 22 can be moved to an opened position (not shown) wherein the first side assembly is spaced a distance from the second side assembly 22. The first side assembly 20 and the second side assembly 22 also are movable to an operating position (shown in FIGS. 1, 2 and 5) wherein the first side assembly 20 is disposed generally near or adjacent the second side assembly 22.

In operation, the first and the second side assemblies 20 and 22 are moved to the opened position and the animal enters the animal chute through a rearward end (not shown) of the animal chute 10 and the animal moves between the first and the second side assemblies 20 and 22 to a position wherein the animal's head is extended generally beyond the forward end 16 of the animal chute 10. In this position of the animal, the first and the second side assemblies 20 and 22 then are moved to the closed or operating position to secure the animal generally between the first and the second side assemblies 20 and 22 with the animal's neck and head extending generally through the head opening 18.

Animal chutes which are constructed and operated in a manner described before with respect to the animal chute 10 are well known in the art and such animal chutes are commercially available from various sources such as Flying W Livestock, Equipment of Watonga, Oklahoma, a business owned by the inventor of the present invention.

A head bar 24 which is constructed and operated in accordance with the present invention is movably connected to the forward end 16 of the animal chute 10. The head bar 24 has a first end 26 and a second end 28. More particularly, a portion of the head bar 24 generally near the first end 26 is pivotally or movably connected to the forward end 16 of the animal chute 10.

In the embodiment of the invention shown in the drawings, a head bar frame 30 is connected to the forward end 16 of the animal chute 10 and disposed generally near the upper end 12 of the animal chute 10. The head bar frame 30 extends a distance generally outwardly from the forward end 16 of the animal chute 10. A portion of the head bar 24 generally near the first end 26 is pivotally connected to the head bar frame 30 by way of a pivot connection 32 so that a portion 34 of the head bar 24 extends a distance generally upwardly from the head bar frame 30. The remaining portion of the head bar 24 extends generally downwardly from the head bar frame 30.

One end of a cylinder rod of a hydraulic cylinder 36 is pivotally connected to the first end 26 of the head bar 24 by way of a pivot connection 38. The base of the hydraulic cylinder 36 is pivotally connected to the head bar frame 30 by way of a pivot connection 40, although the hydraulic cylinder 36 could be connected to the upper end 12 of the animal chute 10.

The hydraulic cylinder 36 is connected to a hydraulic fluid supply and controller 42. The hydraulic fluid supply and controller 42 is adapted to operate the hydraulic cylinder so that, in one position, the hydraulic fluid supply and controller 42 operates the hydraulic cylinder 36 to extend the cylinder rod therefrom and, in one other position, the hydraulic fluid supply and controller 42 operates the hydraulic cylinder 36 to withdraw or move the cylinder rod into the base of the hydraulic cylinder 36. When the hydraulic fluid supply and controller 42 is positioned to actuate the hydraulic cylinder 36 to extend the cylinder rod therefrom, the hydraulic cylinder 36 operates to pivotally move the head bar 24 in a generally arcuate path in a general direction 44 (Figure generally from a first side 46 generally toward a second side 48 of the animal chute 10 and generally toward the upper end 12 of the animal chute 10. When the hydraulic fluid supply and controller 42 is positioned to actuate the hydraulic cylinder 36 to move the cylinder rod into the base of the hydraulic cylinder 36, the hydraulic cylinder 36 operates to pivotally move the head bar in a general direction 50 (FIG. 1) generally from the second side 48 toward the first side 46 of the animal chute 10.

The hydraulic cylinder 36 is connected to the head bar 24 and constructed so that, when the hydraulic fluid supply and controller 42 is positioned to actuate the hydraulic cylinder 36 to move the cylinder rod generally outwardly from the base of the hydraulic cylinder 36, the hydraulic cylinder 36 operates to move the head bar 24 from a storage position (shown in FIG. 1) wheri-enthe head bar 24 extends geneally along the first side 46 of the animal chute 10 to an operating positoinn (shown in FIGS. 2 and 5) wherein the head bar 24 extends generally across the forward end 16 of the animal chute 10 and over a portion of he head opening 18. More particularly, the head bar 24 is positioned on the animal chute 10 so that, when the head bar 24 is moved in the direction 44 toward the operating position, a portion of the head bar 24 engages the animal's head which is extended through the head opening 18 and moves the animal's head generally toward the second side 48 of the animal chute 10 and, in the operating position of the head bar 24, the head bar 24 secures or stabilizes the animal's head in this bent position (FIG. 5).

When the animal is held in the animal chute 10, it is common to draw blood from the animal's juggler vein for obtaining a sample for testing purposes or to administer an IV to the animal. In the operating position of the head bar 24, the head bar 24 operates to bend the animal's head and secure the animal's head in this bent position thereby making the juggler vein of the animal more accessible and securing the animal's head in this bent position whereby it is simpler, easier and more convenient to administer IVs or stick the animal's juggler vein. Also, in this secured bent position of the animal's head, the operator can more easily check the animal's teeth.

A bar extension 52 is connected to the head bar 24. The bar extension 52 has a first end 54 and a second end 56. The bar extension 52 is spaced a distance 58 (FIG. 4) from the head bar 24 and the bar extension 52 is connected to the head bar 24 by way of a plurality of spaced apart rods 60 (only one of the rods 60 being designated by a reference numeral in the drawings). The second end 56 of the bar extension 52 is disposed near and spaced a distance from the second end 28 of the head bar 24 and the bar extension 52 extends a distance generally parallel with the head bar 24 to a position wherein the first end 54 of the bar extension 52 is disposed generally between the first and the second ends 26 and 28 of the head bar 24. The head bar 24 is spaced a distance 62 (FIG. 4) from the forward end 16 of the animal chute 10 and the bar extension 52 is spaced a distance 64 (FIG. 4) from the forward end 16 of the animal chute 10. The distance 64 is less than the distance 62 so that the bar extension 52 is disposed generally closer to the forward end 16 of the animal chute 10 as compared to the head bar 24. The bar extension 52 is utilized for engaging the neck and head area of smaller animals since it is disposed closer to the forward end 16 of the animal chute 10.

A portion of the head bar 24 generally near the second end 28 is bent at an angle to facilitate the movement of the head bar 24 across a portion of the head opening 18 for engaging the animal's head.

It should be noted that the head bar 24 can be moved in the direction 44 passed the head opening 18. Then, the animal's head can be positioned in the head opening 18. In this operational embodiment, the head bar 24 is moved in the direction 50 to a position wherein the head bar 24 engages and bends the animal's head. Thus, the head bar 24 can be operated to bend the animal's head in either the direction 44 or the direction 50.

Changes may be made in the various parts, elements and assemblies of the present invention as described herein without departing from the spirit and scope of the invention as defined in the following claims.

What is claimed is:

1. An improvement in an animal holding chute having an upper end, a lower end, a first side, a second side and a forward end, a head opening being formed in the forward end of the animal chute wherein the head opening is sized and adapted to accommodate the animal's head whereby the animal's neck is disposed through the head opening with the animal's head extending a distance from the head opening when the animal is supported in the animal holding chute in an operating position of the animal holding chute, the improvement being adapted to facilitate access to the animal's juggler vein in the animal's neck and to substantially stabilize the animal's head and neck area in a bent position, the improvement comprising:

a head bar having a first end and a second end;

means for movably supporting the head bar near the forward end of the animal holding chute; and means for moving the head bar to a storage position wherein the head bar is spaced a distance from the head opening and for moving the head bar to an operating position, the head bar engaging the animal's head as the head bar is moved tot eh operating position whereby the had bar moves the animal'head toward the second side of the animal holding chute and toward the forward end of the animal holding chute, the head bar cooperating to secure the animal'head in this bent position and facilitate access to the animal's juggler vein.

2. The improvement of claim 1 wherein the means for supporting the head bar is defined further as supporting the head bar spaced a distance from the forward end of the animal holding chute, the improvement further comprising:

a bar extension having a first end and a second end, the bar extension being connected to the head bar and being spaced a distance from the head bar, the bar extension extending a distance generally between the first end and the second end of the head bar and the head bar extension being engagable with portions of the animal's head in the operating position of the head bar, the bar extension cooperating for moving an securing smaller animal's heads.

3. The improvement of claim 2 wherein the bar extension is spaced a distance from the head bar in a direction generally toward the forward end of the animal chute whereby the bar extension is disposed closer than the head bar to the forward end of the animal holding chute.

4. The improvement of claim 1 wherein the means for supporting the head bar further comprises:

a head bar frame connected to the forward end of the animal holding chute and disposed generally near the upper end of the animal holding chute; and wherein a portion of the head bar generally near the first end thereof is pivotally connected to the head bar frame.

5. The improvement of claim 4 wherein the means for supporting the head bar further comprises:

means movably connected to the head bar generally near the first end of the head bar for pivotally moving the head bar about the pivot connection between the head bar and the head bar frame from the storage position to the operating position and from the operating position to the storage position.

6. The improvement of claim 5 wherein the means for moving the head bar further comprises:

a hydraulic cylinder movably connected to the head bar frame and movably connected to the head bar generally near the first end of the head bar having one actuated position for moving the head bar to the storage positoin and one other actuated position for moving the head bar to the operating position.

7. The improvement of claim 4 wherein at least a portion of the head bar frame is disposed generally near the first side of the animal holding chute and wherein the head bar is pivotally connected to the head bar frame generally near the first side of the animal holding chute, and wherein the head bar extends a distance generally from the upper end of the animal holding chute toward the lower end of the animal holding chute and generally along and near the first side of the animal holding chute in the storage position of the head bar, and wherein the second end of the head bar is moved in a generally arcuate path generally toward the second side of the animal holding chute and generally toward the upper end of the animal holding chute as the head bar is moved to the operating position.

8. The improvement of claim 1 wherein a portion of the head bar generally near and spaced a distance from the second end of the head bar extends at an angle with respect to the remaining portions of the head bar.

9. An apparatus comprising:
an animal holding chute having an upper end, a lower end, a first side and second side and a forward end, a head opening being formed in the forward end of the animal holding chute, the head opening being sized and shaped to accommodate the animal's head with the animal's neck and head extending through the head opening when the animal is supported in the animal holding chute in an operating position of the animal holding chute;
a head bar having a first and a second end;
means for movably supporting the head bar near the forward end of the animal holding chute; and
means for moving the head bar to a storage position wherein the head bar is spaced a distance from the head opening and for moving the head bar to an operating position, the head bar engaging the animal's head as the head bar is moved to the operating position whereby the head bar moves the animal's head toward the second side of the animal holding chute and toward the forward end of the animal holding chute, the head bar cooperating to secure the animal's head in this bent position and facilitate access to the animal's juggler vein.

10. The apparatus of claim 9 wherein the means for supporting the head bar is defined further as supporting the head bar spaced a distance from the forward end of the animal holding chute, the improvement further comprising:
a bar extension having a first end and a second end, the bar extension being connected to the head bar and being spaced a distance from the head bar, the bar extension extending a distance generally between the first end and the second end of the head bar and the head bar extension being engagable with portions of the animal's head in the operating position of the head bar, the bar extension cooperating for moving an securing smaller animal's heads.

11. The apparatus of claim 10 wherein the bar extension is spaced a distance from the head bar in a direction generally toward the forward end of the animal chute whereby the bar extension is disposed closer than the head bar to the forward end of the animal holding chute.

12. The apparatus of claim-9 wherein the means for supporting the head bar further comprises:
a head bar frame connected to the forward end of the animal holding chute and disposed generally near the upper end of the animal holding chute; and wherein a portion of the head bar generally near the first end thereof is pivotally connected to the head bar frame.

13. The apparatus of claim 12 wherein the means for supporting the head bar further comprises:
means movably connected to the head bar generally near the first end of the head bar for pivotally moving the head bar about the pivot connection between the head bar and the head bar frame from the storage position to the operating position and from the operating position to the storage position.

14. The apparatus of claim 13 wherein the means for moving the head bar further comprises:
a hydraulic cylinder movably connected to the head bar frame and movably connected to the head bar generally near the first end of the head bar having one actuated position for moving the head bar to the storage position and one other actuated position for moving the head bar to the operating position.

15. The apparatus of claim 12 wherein at least a portion of the head bar frame is disposed generally near the first side of the animal holding chute and wherein the head bar is pivotally connected to the head bar frame generally near the first side of the animal holding chute, and wherein the head bar extends a distance generally from the upper end of the animal holding chute toward the lower end of the animal holding chute and generally along and near the first side of the animal holding chute in the storage position of the head bar, and wherein the second end of the head bar is moved in a generally arcuate path generally toward the second side of the animal holding chute and generally toward the upper end of the animal holding chute as the head bar is moved to the operating position.

16. The apparatus of claim 9 wherein a portion of the head bar generally near and spaced a distance from the second end of the head bar extends at an angle with respect to the remaining portions of the head bar.

* * * * *

UNITED STATES PATENT AND TRADEMARK OFFICE
CERTIFICATE OF CORRECTION

PATENT NO. : 4,947,800
DATED : August 14, 1990
INVENTOR(S) : Wilford L. Widney

It is certified that error appears in the above-identified patent and that said Letters Patent is hereby corrected as shown below:

Column 2, line 52, immediately following the word "Figure", please insert the number -- 1 --.

Column 2, line 52, please add an -- ) -- , to close the open bracket that appears before the word "Figure".

Column 2, line 68, and Column 3, line 1, please delete the word "wheri-enthe" and substitute therefor the words -- wherein the --.

Column 4, line 23, please delete the words "tot eh" and substitute therefor the words -- to the --.

Column 4, line 24, please delete the word "had" and substitute therefor the word -- head --.

Column 4, lines 24 & 25, please delete the words "ani-mal'head" and substitute therefor the words -- animal's head --.

UNITED STATES PATENT AND TRADEMARK OFFICE
CERTIFICATE OF CORRECTION

PATENT NO. : 4,947,800

DATED : August 14, 1990

INVENTOR(S) : Wilford L. Widney

It is certified that error appears in the above-identified patent and that said Letters Patent is hereby corrected as shown below:

Column 4, line 28, please delete the word "animal'head" and substitute therefor the words -- animal's head --.

Signed and Sealed this

Twenty-seventh Day of August, 1991

Attest:

HARRY F. MANBECK, JR.

*Attesting Officer*    *Commissioner of Patents and Trademarks*